(No Model.) 5 Sheets—Sheet 1.

G. KRUEGER.
MEASURING AND REGISTERING DEVICE.

No. 531,047. Patented Dec. 18, 1894.

WITNESSES:
Chas. Nida.
C. Sedgwick.

INVENTOR
G. Krueger
BY
Munn & Co
ATTORNEYS.

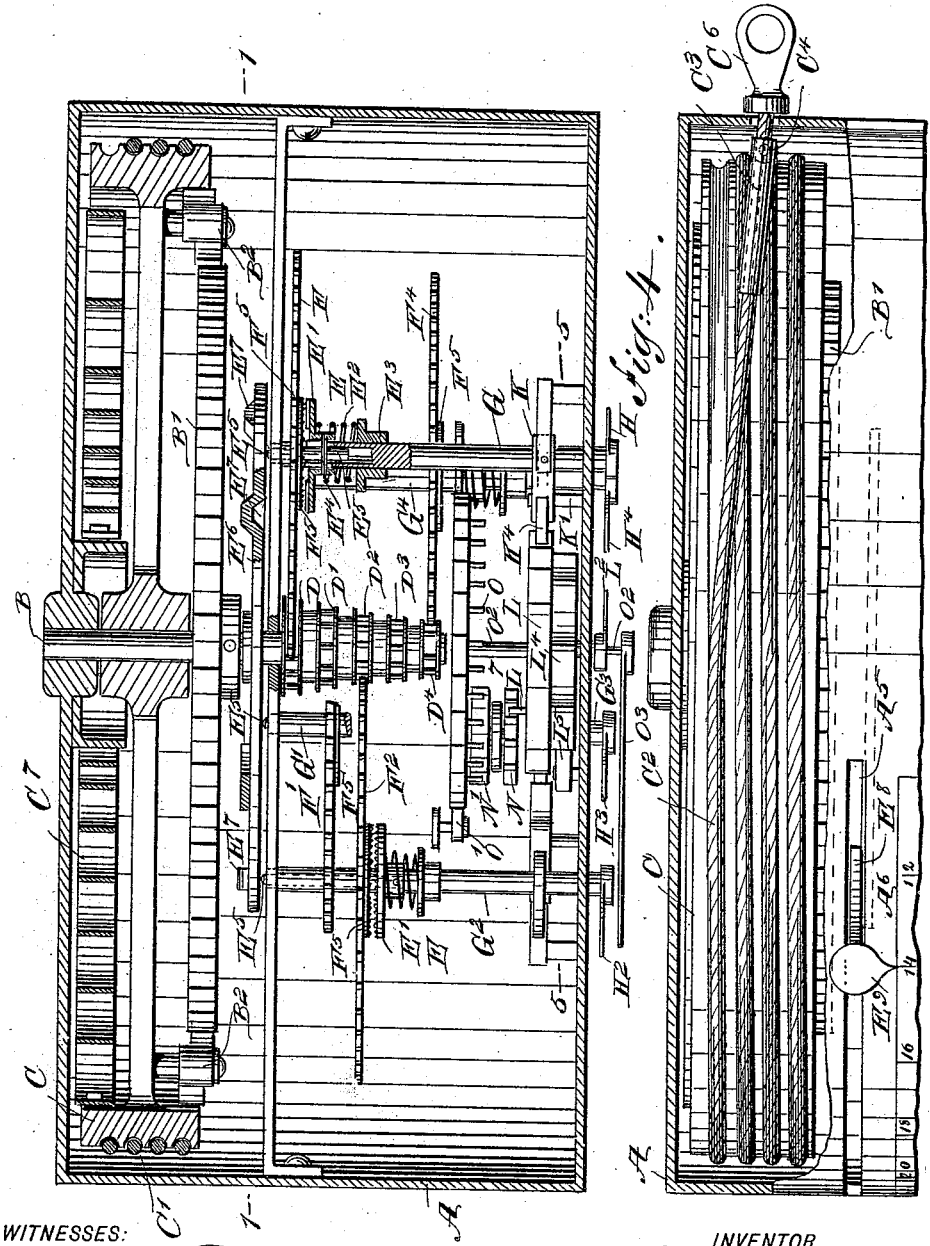

(No Model.) 5 Sheets—Sheet 3.
G. KRUEGER.
MEASURING AND REGISTERING DEVICE.
No. 531,047. Patented Dec. 18, 1894.
Fig: 5.
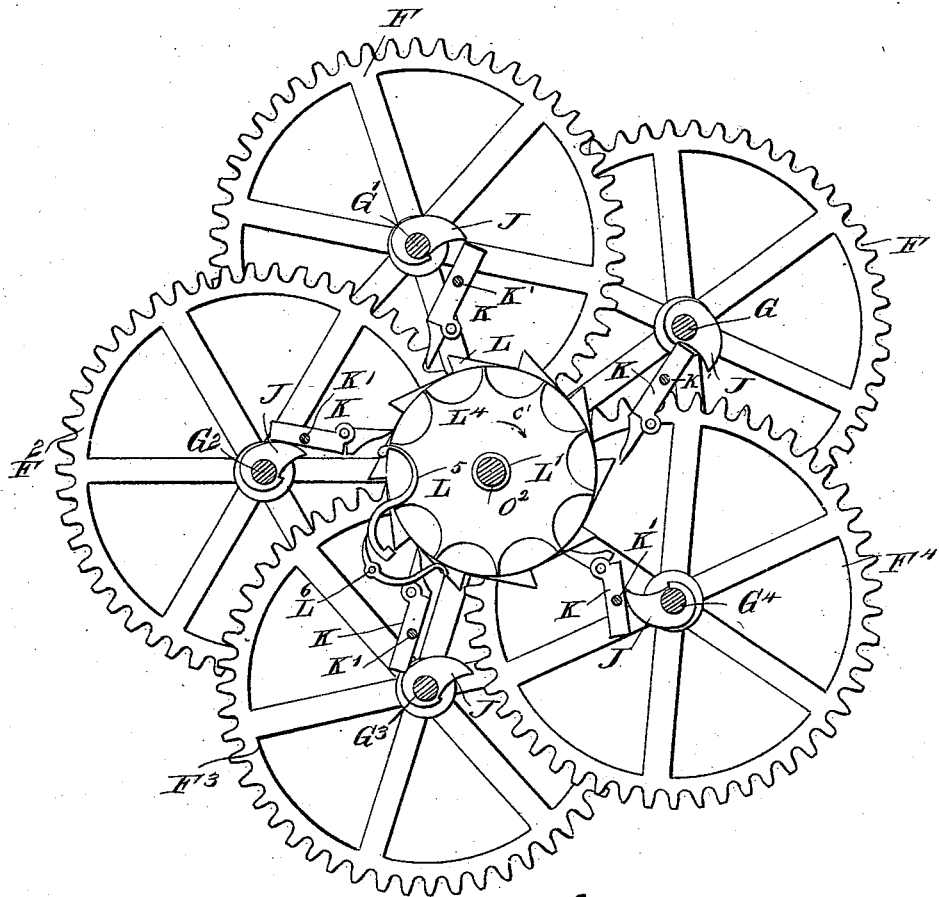
Fig: 6.
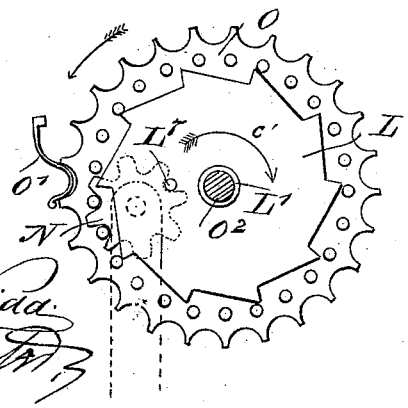
WITNESSES:
INVENTOR
G. Krueger
BY
Munn & Co.
ATTORNEYS.

(No Model.)  5 Sheets—Sheet 4.

G. KRUEGER.
MEASURING AND REGISTERING DEVICE.

No. 531,047.  Patented Dec. 18, 1894.

(No Model.)

G. KRUEGER.
MEASURING AND REGISTERING DEVICE.

No. 531,047. Patented Dec. 18, 1894.

WITNESSES:
Chas. Nida.
Theo. G. Hoster

INVENTOR
G. Krueger
BY
Munn & Co.
ATTORNEYS.

UNITED STATES PATENT OFFICE.

GEORGE KRUEGER, OF JOHNSTOWN, PENNSYLVANIA.

MEASURING AND REGISTERING DEVICE.

SPECIFICATION forming part of Letters Patent No. 531,047, dated December 18, 1894.

Application filed April 28, 1894. Serial No. 509,391. (No model.)

*To all whom it may concern:*

Be it known that I, GEORGE KRUEGER, of Johnstown, in the county of Cambria and State of Pennsylvania, have invented a new and Improved Measuring and Registering Device, of which the following is a full, clear, and exact description.

The object of my invention is to provide a new and improved measuring and registering device, designed for accurately measuring, calculating, and adding the number of feet in areas of given length, the device being more especially adapted for measuring lumber and keeping record thereof, and for various other purposes.

The invention consists principally of a cord for controlling a wheel adapted to connect with a number of graduated gear wheels, each controlling a registering device.

The invention also consists in certain parts and details, and combinations of the same, as will be fully described hereinafter and then pointed out in the claims.

Reference is to be had to the accompanying drawings, forming a part of the specification, in which the same letters of reference indicate the same or corresponding parts in all the views.

Figure 1:
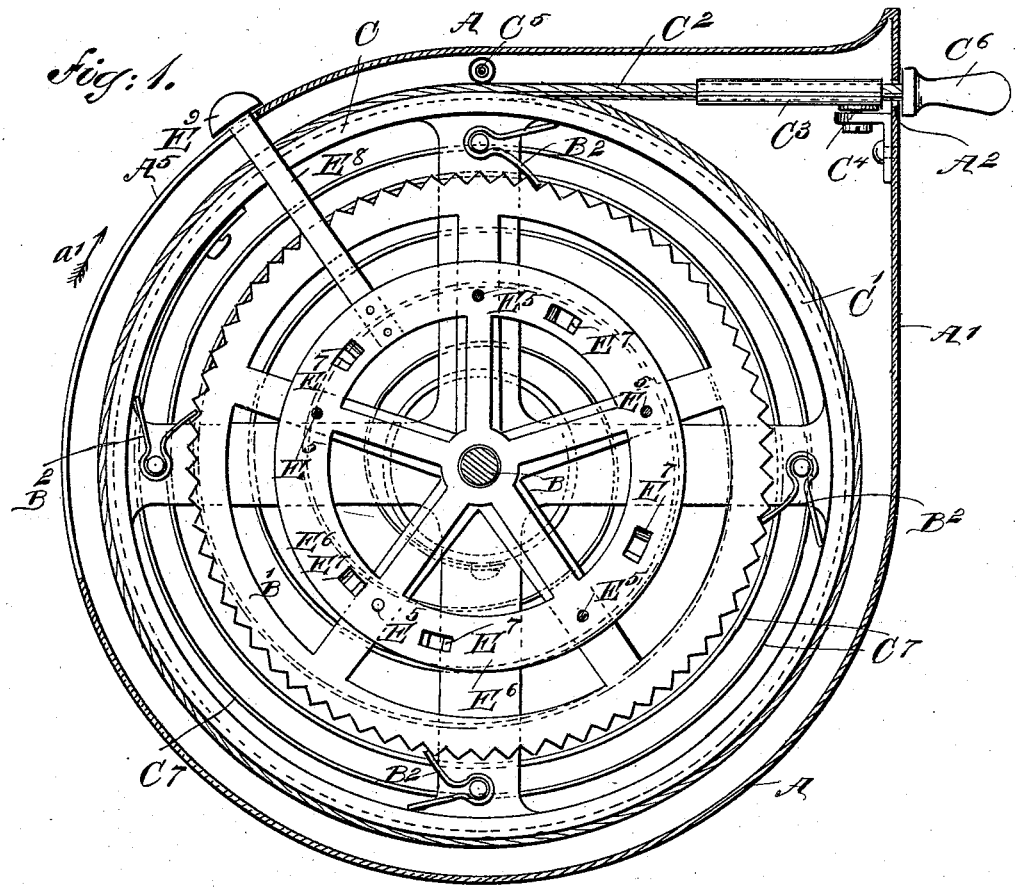
Figure 2:
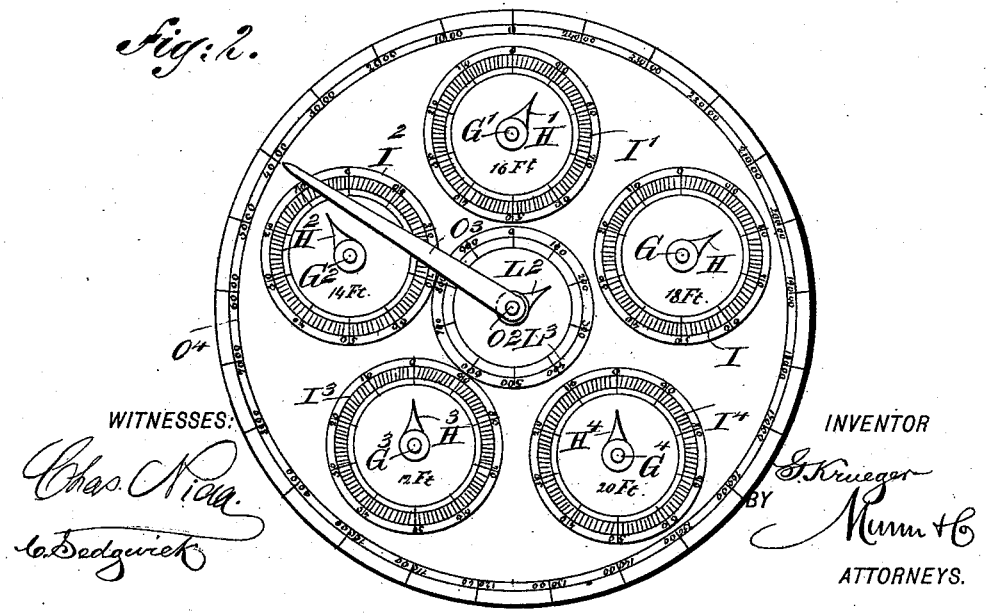
Figure 7:
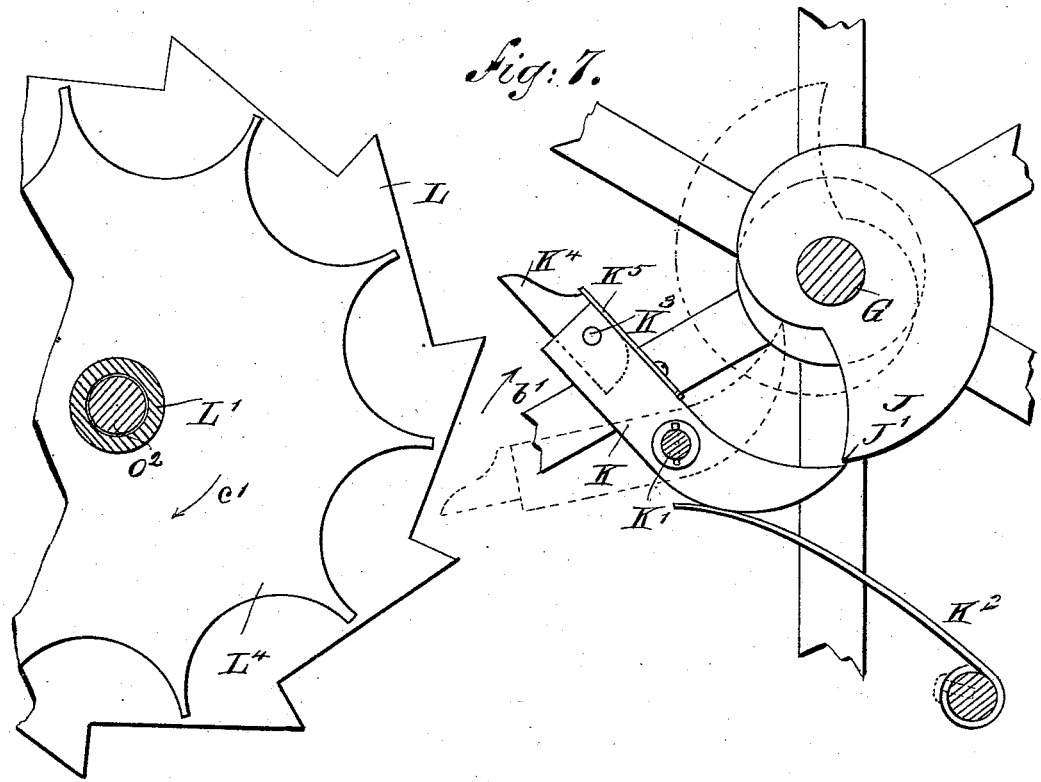
Figure 8:
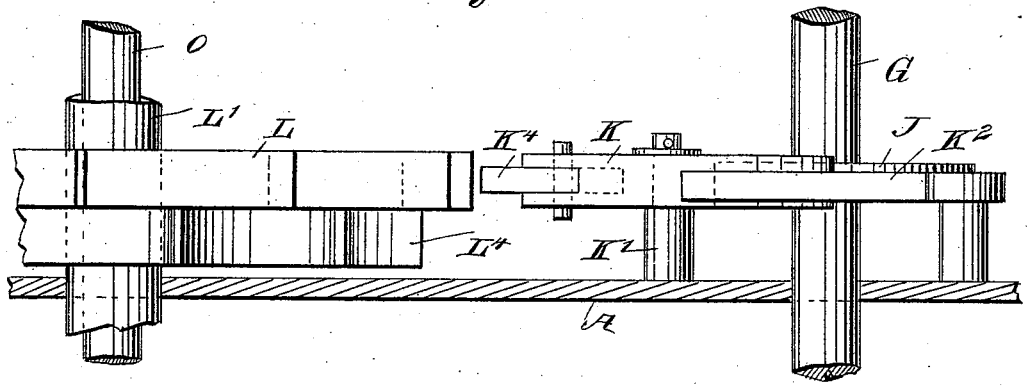
Figure 9:
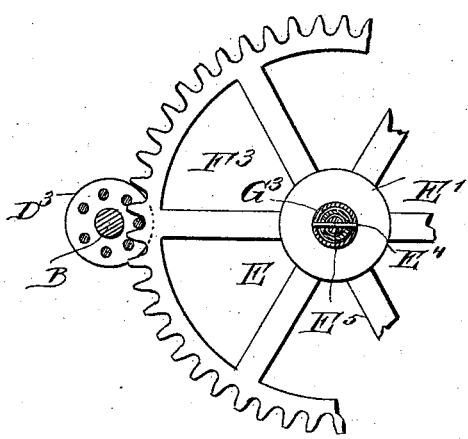
Figure 10:
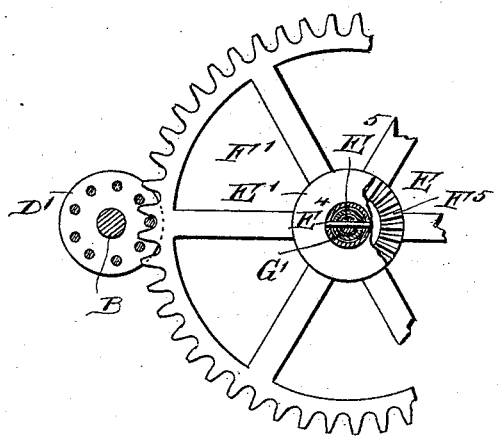
Figure 11:
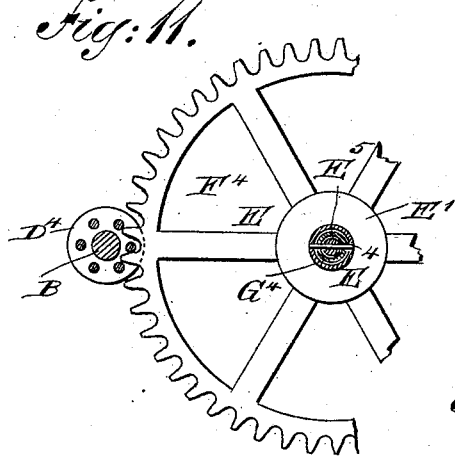
Figure 12:
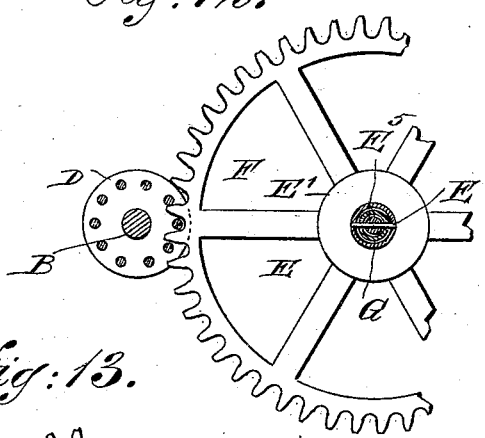
Figure 13:
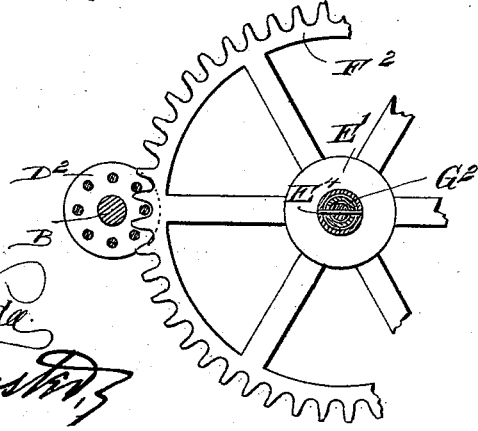

Figure 1 is a sectional side elevation of the improvement, on the line 1—1 of Fig. 3. Fig. 2 is a reduced side elevation of the same, showing the registering device. Fig. 3 is an enlarged sectional plan view of the improvement. Fig. 4 is a plan view of the same with parts in section. Fig. 5 is an enlarged sectional side elevation of part of the registering device, on the line 5—5 of Fig. 3. Fig. 6 is an enlarged sectional side elevation of part of the adding mechanism. Fig. 7 is an enlarged sectional side elevation of part of the registering mechanism. Fig. 8 is a plan view of the same, with the casing in section; and Figs. 9, 10, 11, 12, and 13 are sectional side elevations of the graduated gear wheels in mesh with their registering wheels.

The improved measuring and registering device is provided with a suitably constructed casing A, formed with the straight end A' adapted to abut against one edge of the article to be measured, so as to hold the casing stationary on the article while the measure is taken. In the casing A is journaled the transversely extending shaft B, on which is mounted to turn loosely a wheel C, provided in its periphery with a helical groove C', engaged by a measuring cable, cord, rope, band or chain $C^2$ made of suitable material and fastened at one end to the said wheel at the periphery thereof. The outer end of the cable $C^2$ is adapted to pass through a guiding tube $C^3$, pivoted at $C^4$ to the inside of the casing at the side A', the said guiding tube extending about horizontally and longitudinally to the top of the wheel C. A friction roller $C^5$ is journaled in the front and rear of the casing A and extends over the cable at the top of the wheel C to hold the cable in place in the groove C'. The cable after passing through the tube $C^3$ passes through an opening $A^2$ formed in the straight end A' of the casing A.

On the outer end of the cable $C^2$ is arranged a suitable handle $C^6$, adapted to be taken hold of by the operator to pull the cable outward out of the casing and over the surface to be measured, as hereinafter more fully described. The wheel C is controlled by a spring $C^7$ connected at its inner end with the casing A, and at its outer end with the rim of the wheel C as shown in Fig. 3. Thus, when the cable $C^2$ is pulled outward it unwinds from the wheel C and rotates the latter, so as to wind up the spring $C^7$. When the operator releases the handle $C^6$, then the previously compressed spring $C^7$ causes a return movement of the wheel, so as to again wind up the cable $C^2$ on the said wheel C.

On the shaft B is secured a ratchet wheel B' engaged by a series of spring or other pawls $B^2$ held on the inner face of the wheel C, as plainly illustrated in Figs. 1 and 3, the said ratchet wheel B' and pawls $B^2$ being arranged in such a manner that when the wheel C is turned in the direction of the arrow a', on pulling the cable $C^2$ outward, then the said pawls $B^2$ carry the ratchet wheel B' along, to rotate the shaft B in the same direction. When the cable $C^2$ is again wound up on its wheel C, as previously described, by the operator releasing the pull on the handle $C^6$, then the wheel C travels in the inverse direction of the arrow a', and the pawls $B^2$ held on the said ring then glide over the teeth of the ratchet wheel B', without turning the latter.

On the inner end of the shaft B is secured a series of graduated gear wheels D, D', D², D³ and D⁴, having a different number of teeth, as plainly shown in Figs. 9 to 13 inclusive, the said wheels each controlling a registering device presently to be described in detail.

The gear wheels D, D', D², D³, and D⁴ mesh into gear wheels F, F', F², F³, and F⁴ respectively, mounted to rotate loosely on transversely extending shafts G, G', G², G³, G⁴ respectively journaled in suitable bearings in the casing A, the said shafts extending to the front face of the casing A, as plainly illustrated in Figs. 2 and 3.

On each shaft G, G', G², G³, and G⁴ is arranged a clutch mechanism E consisting of a slidable clutch disk E' adapted to engage a clutch F⁵ on the corresponding wheel F, F', F², F³, or F⁴ so that when the clutch E on any one of the shafts G, G', G², G³, or G⁴ is in mesh or engagement with the corresponding gear wheel F, F', F², F³, or F⁴, then the rotary motion of the latter is transmitted to the corresponding shaft G, G', G², G³, or G⁴. Each clutch disk E' is pressed on by a spring E² coiled on the respective shaft and abutting on a collar E³ fixed on the shaft. A pin E⁴ (see Figs. 9 and 10) is carried on the hub of each slidable disk E' and extends through a slot in the inner end of the shaft G, G', G², G³, or G⁴, the said pin being also held in a rod E⁵ fitted to slide in the hollow inner end of the corresponding shaft G, G', G², G³, or G⁴ on Fig. 3.

The several rods E⁵ extend beyond the inner open ends of the shafts G, G', G², G³, and G⁴ and abut on the face of an indicating wheel E⁶ mounted to rotate loosely on the shaft B. The said wheel is provided in its face with recesses E⁷ arranged in a circle and adapted to be engaged by the rods E⁵, it being understood that the rods rest normally on the straight face of the wheel E⁶ to hold the clutch disk E' out of engagement with the clutches F⁵ of the several gear wheels F, F', F², F³, and F⁴. Now when the operator shifts the indicating wheel E⁶ to bring a corresponding recess in alignment with its rod E⁵ then the spring E² for this rod forces the latter transversely to carry the clutch disk E' along and move it in mesh with the clutch on the corresponding wheel F, F', F², F³, or F⁴ to lock this wheel to the corresponding shaft G, G', G², G³, or G⁴. A rotary motion given to the shaft B by manipulating the cable C² as above described will rotate the shaft G, G', G², G³, or G⁴ for which the wheel E⁶ was set. The wheel E⁶ is provided with a handle E⁸ extending through a slot A⁵ in the casing A as shown in Fig. 4. The casing is provided at one edge of the slot with a graduation A⁶ indicating the various lengths of the articles to be measured. A knob and pointer E⁹ on the outer end of the handle E⁸ serves to move the latter and to indicate the desired point on the graduation. Now it will be seen that when the handle E⁸ of the indicating wheel E⁶ stands at the end of the slot A⁵ or between points of the graduation A⁶, then the said wheel is not engaged at any one of its recesses E⁷ by a pin E⁵, so that all the clutch devices E are inactive and the gear wheels F, F', F², F³, and F⁴ are all uncoupled from the shafts G, G', G², G³, and G⁴ respectively. Now when the operator moves the knob pointer E⁹ to a mark on the graduation A⁶, then the corresponding recess E⁷ is brought in alignment with its rod E⁵, to permit the spring E² to shift the slidable clutch disk E' in mesh with the clutch F⁵ on the corresponding gear wheel F, F', F², F³, or F⁴ and lock this gear wheel to its corresponding shaft G, G', G², G³, or G⁴. The device is then set for measuring articles of a length indicated on the respective point on the graduation A⁶.

On the outer ends of the shafts G, G', G², G³, and G⁴ are secured pointers H, H', H², H³, and H⁴, indicating on dials I, I', I², I³, and I⁴ respectively, arranged on the front face of the casing A, as plainly illustrated in Fig. 2. The several dials mentioned are graduated to indicate from zero (0) to one hundred feet, board measure, which is one foot square and one inch thick, the several dials indicating further for different lengths of boards, the unit of such length being marked on the dial, and corresponds to the corresponding mark on the graduation A⁶, as shown in Fig. 2. Thus the dial I is for eighteen feet length, the dial I' for sixteen feet length, the dial I² for fourteen feet length, the dial I³ for twelve feet length, and the dial I⁴ for twenty feet length, but it is evident that this can be changed to any length desired, by providing a different series of graduated wheels D, D', D², D³, D⁴.

Now it will be seen that when boards, say of eighteen feet length are measured, then the operator moves the knob E⁹ to the mark 18 on graduation A⁶, so that when the cable is drawn across the boards, then the said gear wheel D is rotated as previously described, on the pulling out of the cable C² as before mentioned. The rotary motion of the gear wheel D is transmitted to the gear wheel F and shaft G, so that the pointer H is moved on the dial I, to indicate the amount of board measure in the lumber under treatment.

In order to give the entire amount of all the lumber measured, the following adding device is provided. On each shaft G, G', G², G³, and G⁴, is secured a cam J, adapted to actuate a lever K, fulcrumed on a pin K' secured to the front of the casing, at the inner face thereof, as plainly shown in Figs. 3 and 8. A spring K², fastened at one end to a pin on the casing, presses with its other end on the said lever K, to hold its inner end at all times in frictional contact with the peripheral surface of the corresponding cam J. In the outer or free end of the lever K is pivoted at K³, a toe K⁴, pressed on by a spring K⁵ so as to hold the said toe K⁴ in position in one direction, but to permit the toe to swing in an opposite direction. The toes of the several levers K are adapted to act on a ratchet wheel L secured on a sleeve L', journaled in suitable bearings in the casing A, the said sleeve L' carrying on its outer end a pointer L², indicating on a dial L³ arranged on the front face of the casing A, as illustrated in Fig. 2. This dial L³ indicates from zero (0) to one thousand feet of lumber measure.

Now, it will be seen that when one of the shafts G, G', G², G³, or G⁴ is rotated, then its corresponding cam J acts on its lever K so as to impart a swinging motion to the lever, to move the toe K⁴ away from the ratchet wheel L, that is, in the direction of the arrow $b'$, until finally the point J' of the said cam passes the inner end of the lever K, to permit the latter then to suddenly swing by the action of the previously compressed spring K², and throw the outer end, that is, the toe K⁴, in contact with a tooth of the ratchet wheel L, to turn the latter in the direction of the arrow $c'$. The ratchet wheel L is thus moved the distance between two teeth, and the pointer L² controlled by the said ratchet wheel is shifted to the next following numeral on the dial L³, thus indicating that boards containing one hundred feet lumber measure have been measured, and the corresponding pointer H, H', H², H³, H⁴ has passed back to the zero mark on its corresponding dial I, I', I², I³, or I⁴.

In order to prevent the ratchet wheel L from being moved too far by the corresponding lever K, I provide a lock wheel L⁴, carrying a spring L⁵ engaged by a spring L⁶ fulcrumed on the casing, as shown in Figs. 3 and 5.

In order to register a total of more than one thousand feet of lumber measure, the following device is provided: On the inner face of the ratchet wheel L is secured a pin L⁷ adapted to engage and turn a wheel N, journaled in suitable bearings erected in the casing A, the said gear wheel carrying a second gear wheel N' in mesh with a gear wheel O, secured on a shaft O² journaled in the sleeve L' of the ratchet wheel L, as illustrated in Figs. 3, 6, 7, and 8. In order to prevent the gear wheel O from being moved too far at a time, I provide a spring O', engaging the peripheral surface of the said gear wheel and supported within the casing A. On the outer end of the shaft O² is secured a pointer O³, indicating on a dial O⁴ divided in sub-divisions of one thousand feet of lumber measure. As shown in Fig. 2, the said pointer O² can register up to twenty-five thousand feet of lumber measure.

Now, it will be seen that at each complete rotation of the ratchet wheel L, its pin L⁷ will engage and move the gear wheel N the distance between two teeth, so that the gear wheel N' will move the gear wheel O the distance between two of its teeth, whereby the shaft O² is rotated and the pointer O³ moves from one subdivision to the next following one, thus registering one thousand feet of lumber measure.

It will be seen that the device described is very simple and durable in construction, and can be readily handled and manipulated to accurately obtain the number of feet in areas of given length, say of lumber or other articles and surfaces to be measured.

Having thus described my invention, I claim as new and desire to secure by Letters Patent—

1. A device of the class described, comprising a casing, a main shaft, a cable actuated operating wheel journaled thereon, a series of graduated wheels fixedly held on the shaft, each having an independent registering device connected therewith and normally held out of operative position, and a shifting mechanism loosely mounted on the main shaft, adapted to be set to bring any one of the registering devices into an operative position, as and for the purposes set forth.

2. An improved device of the class described, comprising a casing, a main shaft, a rotatable wheel mounted thereon, spring actuated in one direction and having a cable wound on its periphery and extended through the casing to form a handle member, a series of graduated gear wheels secured on the said shaft, each having a registering device connected therewith, and a shifting mechanism held to rotate on the shaft, and having a handle extended without the casing whereby it can be set to engage any one of the registering devices, as specified.

3. A device of the class described comprising a casing a main operating shaft, means for operating it from the outside of the casing, a series of graduated gear wheels mounted thereon, registering devices having gear wheels loosely mounted on their supporting shafts and held to mesh with the graduated gear wheels, a spring actuated clutch mechanism connected with such registering devices, a shifting disk held to normally engage such clutch devices and hold them out of operative position, but capable of adjustment whereby any one of such clutch devices can be moved into operative position, said disk having an operating member extended to the outside of the casing, all arranged substantially as shown and for the purposes described.

4. A device of the class described, provided with a revoluble wheel having a peripheral groove, and a cable adapted to engage the said groove, the said cable being normally wound up and extending in the groove of the said wheel, so that on pulling the outer end of the cable the said wheel rotates, and a pivoted guide tube for the said cable, substantially as shown and described.

5. In a device of the class described, the combination with a wheel adapted to be turned and having recesses on its face, of a clutch mechanism controlled from the said wheel and comprising a pin adapted to abut on the face of the said wheel and adapted to pass into a corresponding recess, a clutch disk carried by the spring and coupled with the shaft to be driven, and a clutch on the driving gear wheel and adapted to be engaged by the said disk whenever the pin drops into its recess on the said wheel, substantially as shown and described.

6. In a device of the class described, the combination, with a cable, and a spring-pressed revoluble wheel adapted to be turned by the said cable, of a shaft on which the said wheel is loosely mounted, a ratchet wheel held on the said shaft, adapted to be engaged by pawls on the said wheel, a series of graduated gear wheels secured on the said shaft, and a shifting disk held to rotate on the shaft between the gear wheels and the ratchet wheel and having members adapted to be locked one at a time to a registering device, substantially as shown and described.

7. In a device of the class described, the combination with a casing, an operating shaft and ratchet wheel held thereon, a cable actuated operating wheel loosely journaled on the shaft and having spring pawl connections with the ratchet wheels and a series of graduated gear wheels fixedly mounted on the operating shaft, of a registering device for each of the graduated gear wheels comprising a gear wheel held in mesh with its corresponding graduated gear wheel, a shaft carrying said registering gear wheel, a clutch for locking such wheel to the shaft, a shifting mechanism operated from the outside of the casing for setting any one of the clutches to an operative position, and an adding mechanism common to all the registering devices adapted to be operated by the movement of any one of such devices, all substantially as shown and described.

8. In a device, of the class described, the combination, with a series of graduated gear wheels adapted to be turned, of a registering device for each of the said graduated gear wheels, the said registering device comprising a gear wheel in mesh with its corresponding graduated gear wheel, a shaft carrying the said gear wheel, a clutch for locking the said gear wheel to the said shaft, a pointer on the said shaft, a dial on which the said pointer indicates, an adding mechanism actuated from the several parts, the said adding mechanism comprising a cam on each shaft, a spring-pressed lever adapted to be actuated from the said cam, a ratchet wheel adapted to be operated on by the several levers, a pointer carried on the hub of the said ratchet wheel, and a dial on which indicates the last mentioned pointer, substantially as shown and described.

9. A device of the class described, provided with an adding mechanism comprising a series of shafts, a cam on each shaft, spring-pressed levers adapted to be actuated by the said cams, a ratchet wheel adapted to be acted on by the said levers, a pointer carried on the hub of the said ratchet wheel, and a dial on which indicates the said pointer, substantially as shown and described.

10. In a device of the character described, in combination a series of registering devices having each a shaft, provided with a cam and spring pressed levers adapted to be operated by the said cams, and an adding mechanism common to all registering devices and having a ratchet wheel adapted to be acted on by the aforesaid levers, stop devices for limiting the throw of the adding ratchet wheel, a pointer carried on the hub of the said ratchet wheel and a dial on which indicates the said pointer, all arranged substantially as shown and for the purposes described.

GEORGE KRUEGER.

Witnesses:
ED. KEANE,
THEO. G. HOSTER.